US010051510B2

(12) United States Patent
Radin

(10) Patent No.: US 10,051,510 B2
(45) Date of Patent: Aug. 14, 2018

(54) FRONT-HAUL COMMUNICATIONS SYSTEM FOR ENABLING COMMUNICATION SERVICE CONTINUITY IN A WIRELESS DISTRIBUTION SYSTEM (WDS) NETWORK

(71) Applicant: Corning Optical Communications Wireless Ltd, Airport City (IL)

(72) Inventor: Boris Radin, Ashdod (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 120 days.

(21) Appl. No.: 15/167,221

(22) Filed: May 27, 2016

(65) Prior Publication Data

US 2017/0347287 A1 Nov. 30, 2017

(51) Int. Cl.
| | | |
|---|---|---|
| H04W 24/00 | (2009.01) |
| H04W 28/02 | (2009.01) |
| H04W 76/02 | (2009.01) |
| H04W 24/02 | (2009.01) |
| H04W 76/18 | (2018.01) |
| H04W 76/19 | (2018.01) |

(52) U.S. Cl.
CPC ....... *H04W 28/0231* (2013.01); *H04W 24/02* (2013.01); *H04W 76/027* (2013.01); *H04W 76/028* (2013.01); *H04W 76/18* (2018.02); *H04W 76/19* (2018.02)

(58) Field of Classification Search
CPC .. H04W 24/02; H04W 76/027; H04W 76/028
See application file for complete search history.

(56) References Cited

U.S. PATENT DOCUMENTS

| | | | | |
|---|---|---|---|---|
| 9,363,768 B2 | 6/2016 | Hejazi et al. | |
| 2004/0077354 A1* | 4/2004 | Jason | ..................... H04W 8/005 455/450 |
| 2009/0041039 A1* | 2/2009 | Bear | ....................... H04L 45/38 370/401 |
| 2010/0008233 A1* | 1/2010 | Ee | ............................. H04L 43/50 370/241 |
| 2012/0106362 A1* | 5/2012 | Reumerman | .......... H04W 24/00 370/252 |

(Continued)

*Primary Examiner* — Andrew Lee
(74) *Attorney, Agent, or Firm* — C. Keith Montgomery

(57) ABSTRACT

Embodiments of the disclosure relate to a front-haul communications system for enabling communication service continuity in a wireless distribution system (WDS) network. A WDS network includes a front-haul communications system and a plurality of remote WDSs. In this regard, a front-haul link control circuit is provided in the front-haul communications system to detect failed front-haul communication link(s). In response to detecting the failed front-haul communication link(s), the front-haul link control circuit reroutes a disrupted communication service(s) to operational front-haul communication link(s) based on bandwidth capacity requirements of the disrupted communication service(s) and unused bandwidth capacity of the operational front-haul communication link(s). By detecting the failed front-haul communication link(s) and rerouting the disrupted communication service(s) communicated on the failed front-haul communication link(s), it is possible to enable communication service continuity in the WDS network, thus enhancing efficiency and performance of the WDS network.

23 Claims, 11 Drawing Sheets

(56) References Cited

U.S. PATENT DOCUMENTS

| | | | |
|---|---|---|---|
| 2012/0106522 A1* | 5/2012 | Reumerman | H04W 48/08 370/337 |
| 2013/0142136 A1* | 6/2013 | Pi | H04W 28/0289 370/329 |
| 2013/0176859 A1* | 7/2013 | Stanislaus | H04W 24/04 370/242 |
| 2013/0310052 A1* | 11/2013 | Timus | H04W 72/0433 455/445 |
| 2014/0162664 A1 | 6/2014 | Stapleton et al. | |
| 2014/0307702 A1* | 10/2014 | Mese | H04B 7/0456 370/330 |
| 2015/0304044 A1 | 10/2015 | Stapleton et al. | |
| 2015/0358054 A1 | 12/2015 | Lemson et al. | |
| 2015/0365934 A1* | 12/2015 | Liu | H04L 5/0039 370/329 |
| 2016/0073313 A1 | 3/2016 | Hejazi et al. | |
| 2016/0219024 A1* | 7/2016 | Verzun | H04L 63/102 |
| 2016/0226784 A1 | 8/2016 | Stapleton et al. | |
| 2016/0242147 A1* | 8/2016 | Tarlazzi | H04W 72/042 |
| 2017/0048775 A1* | 2/2017 | Kim | H04W 76/027 |

\* cited by examiner

FRONT-HAUL COMMUNICATIONS SYSTEM FOR ENABLING COMMUNICATION SERVICE CONTINUITY IN A WIRELESS DISTRIBUTION SYSTEM (WDS) NETWORK

BACKGROUND

The disclosure relates generally to a front-haul system in a wireless distribution system (WDS), and more particularly to a front-haul system for enabling communication service continuity in a plurality of remote WDSs in a WDS network.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of wireless distribution systems (WDSs). WDSs include remote units configured to receive and transmit communications signals to client devices within the antenna range of the remote units. WDSs can be particularly useful when deployed inside buildings or other indoor environments where the wireless communications devices may not otherwise be able to effectively receive radio frequency (RF) signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as RF identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communication services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

As previously discussed, WDSs can be particularly useful when deployed inside buildings or other indoor environments where the wireless communications devices may not otherwise be able to effectively receive RF signals from a signal source. The transmission power of the remote units 104(1)-104(N) mainly determines the size of the respective remote coverage areas 100(1)-100(N). As such, by configuring the respective remote units 104(1)-104(N) to transmit at appropriate RF power levels, the WDS 102 may provide sufficient RF coverage to an entire building. However, it is often necessary to provide communication services with sufficient RF coverage in a plurality of buildings scattered across a university campus or a large corporate site, for example. In this regard, it may be desirable to deploy a remote WDS in each of the buildings, thus forming a WDS network to provide communication services with sufficient RF coverage to the entire university campus or the large corporate site.

No admission is made that any reference cited herein constitutes prior art. Applicant expressly reserves the right to challenge the accuracy and pertinency of any cited documents.

SUMMARY

Embodiments of the disclosure relate to a front-haul communications system for enabling communication service continuity in a wireless distribution system (WDS) network. For example, the WDS network may be a distributed antenna system (DAS) network. The WDS network includes a front-haul system and a plurality of remote WDSs. The front-haul system includes a plurality of remote digital routing units (DRUs) configured to be communicatively coupled to the plurality of remote WDSs. The plurality of remote DRUs is configured to communicate (i.e., route) digital communications signals, each associated with at least one communication service, with a central DRU over a plurality of front-haul communication links. In this manner, the remote WDSs can be deployed in different locations or areas for distributing communication services from the central DRU received via the respective DRUs in the WDS network. The front-haul communication link(s) may fail at times, thus disrupting communication services associated with the digital communications signal(s) communicated on the failed front-haul communication link(s). In this regard, in aspects disclosed herein, a front-haul link control circuit is provided in the front-haul communications system. The front-haul link control circuit is configured to detect failed front-haul communication link(s). In response to detecting the failed front-haul communication link(s), the front-haul link control circuit is configured to reroute the disrupted communication services to operational front-haul communication link(s) based on bandwidth capacity requirements of the disrupted communication services and unused bandwidth capacity of the operational front-haul communication link(s). By detecting the failed front-haul communication link(s) and rerouting the disrupted communication services communicated on the failed front-haul communication link(s), it is possible to enable communication service continuity in the WDS network, thus enhancing efficiency and performance of the WDS network.

One embodiment of the disclosure relates to a front-haul communications system in a WDS network. The front-haul communications system comprises a plurality of remote DRUs configured to be communicatively coupled to a plurality of remote WDSs. The front-haul communications system also comprises a central DRU configured to communicate a plurality of digital communications signals with the plurality of remote DRUs over a plurality of front-haul communication links communicatively coupling the central DRU to the plurality of remote DRUs. The front-haul communications system also comprises a front-haul link control circuit communicatively coupled to the central DRU and the plurality of remote DRUs. The front-haul link control circuit is configured to detect if a failed front-haul communication link among the plurality of front-haul communication links is unable to communicate a digital communications signal configured to be communicated on the failed front-haul communication link. In response to detecting the failed front-haul communication link, the front-haul link control circuit is further configured to determine at least one bandwidth capacity requirement of at least one disrupted communication service associated with the digital communications signal communicated on the failed front-haul communication link. The front-haul link control circuit is further configured to identify at least one operational front-haul communication link among the plurality of front-haul communication links having unused bandwidth capacity. The front-haul link control circuit is further configured to reroute the at least one disrupted communication service to the at least one operational front-haul communication link among the at least one identified operational front-haul communication link based on the unused bandwidth capacity of the at least one operational front-haul communication link and the at least one determined bandwidth capacity requirement of the at least one disrupted communication service.

Another embodiment of the disclosure relates to a method for providing communication service continuity in a WDS network. The method comprises detecting if a failed front-haul communication link among a plurality of front-haul communication links is unable to communicate a digital communications signal configured to be communicated on the failed front-haul communication link. In response to detecting the failed front-haul communication link, the method also comprises determining at least one bandwidth capacity requirement of at least one disrupted communication service associated with the digital communications signal communicated on the failed front-haul communication link. The method further comprises identifying at least one operational front-haul communication link among the plurality of front-haul communication links having unused bandwidth capacity. The method further comprises rerouting the at least one disrupted communication service to the at least one operational front-haul communication link based on the unused bandwidth capacity of the at least one operational front-haul communication link and the at least one determined bandwidth capacity requirement of the at least one disrupted communication service.

Another embodiment of the disclosure relates to a WDS network. The WDS network comprises a plurality of remote WDSs. The WDS network also comprises a front-haul communications system. The front-haul communications system comprises a plurality of remote DRUs communicatively coupled to the plurality of remote WDSs. The front-haul communications system also comprises a central DRU configured to communicate a plurality of digital communications signals with the plurality of remote DRUs over a plurality of front-haul communication links communicatively coupling the central DRU to the plurality of remote DRUs. The front-haul communications system also comprises a front-haul link control circuit communicatively coupled to the central DRU and the plurality of remote DRUs. The front-haul link control circuit is configured to detect if a failed front-haul communication link among the plurality of front-haul communication links is unable to communicate a digital communications signal configured to be communicated on the failed front-haul communication link. In response to detecting the failed front-haul communication link, the front-haul link control circuit is further configured to determine at least one bandwidth capacity requirement of at least one disrupted communication service associated with the digital communications signal communicated on the failed front-haul communication link. In response to detecting the failed front-haul communication link, the front-haul link control circuit is further configured to identify at least one operational front-haul communication link among the plurality of front-haul communication links having unused bandwidth capacity. In response to detecting the failed front-haul communication link, the front-haul link control circuit is further configured to reroute the at least one disrupted communication service to the at least one operational front-haul communication link based on the unused bandwidth capacity of the at least one operational front-haul communication link and the at least one determined bandwidth capacity requirement of the at least one disrupted communication service.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to a front-haul communications system for enabling communication service continuity in a wireless distribution system (WDS) network. For example, the WDS network may be a distributed antenna system (DAS) network. The WDS network includes a front-haul system and a plurality of remote WDSs. The front-haul system includes a plurality of remote digital routing units (DRUs) configured to be communicatively coupled to the plurality of remote WDSs. The plurality of remote DRUs is configured to communicate (i.e., route) digital communications signals, each associated with at least one communication service, with a central DRU over a plurality of front-haul communication links. In this manner, the remote WDSs can be deployed in different locations or areas for distributing communication services from the central DRU received via the respective DRUs in the WDS network. The front-haul communication link(s) may fail at times, thus disrupting communication services associated with the digital communications signal(s) communicated on the failed front-haul communication link(s). In this regard, in aspects disclosed herein, a front-haul link control circuit is provided in the front-haul communications system. The front-haul link control circuit is configured to detect failed front-haul communication link(s). In response to detecting the failed front-haul communication link(s), the front-haul link control circuit is configured to reroute the disrupted communication services to operational front-haul communication link(s) based on bandwidth capacity requirements of the disrupted communication services and unused bandwidth capacity of the operational front-haul communication link(s). By detecting the failed front-haul communication link(s) and rerouting the disrupted communication services communicated on the failed front-haul communication link(s), it is possible to enable communication service continuity in the WDS network, thus enhancing efficiency and performance of the WDS network.

Figure 1:
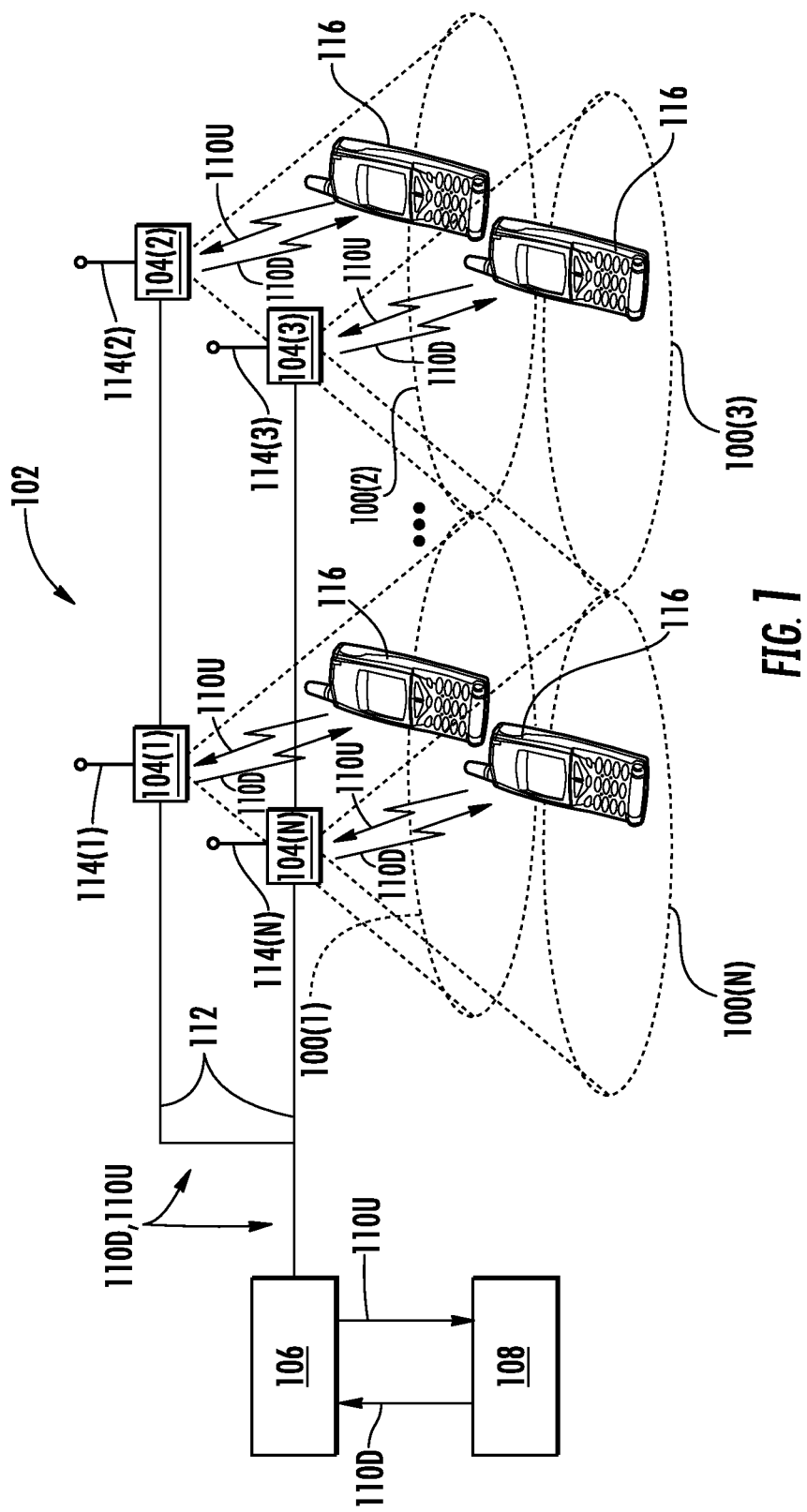
FIG. 1 is a schematic diagram of an exemplary wireless distribution system (WDS)
Figure 2:
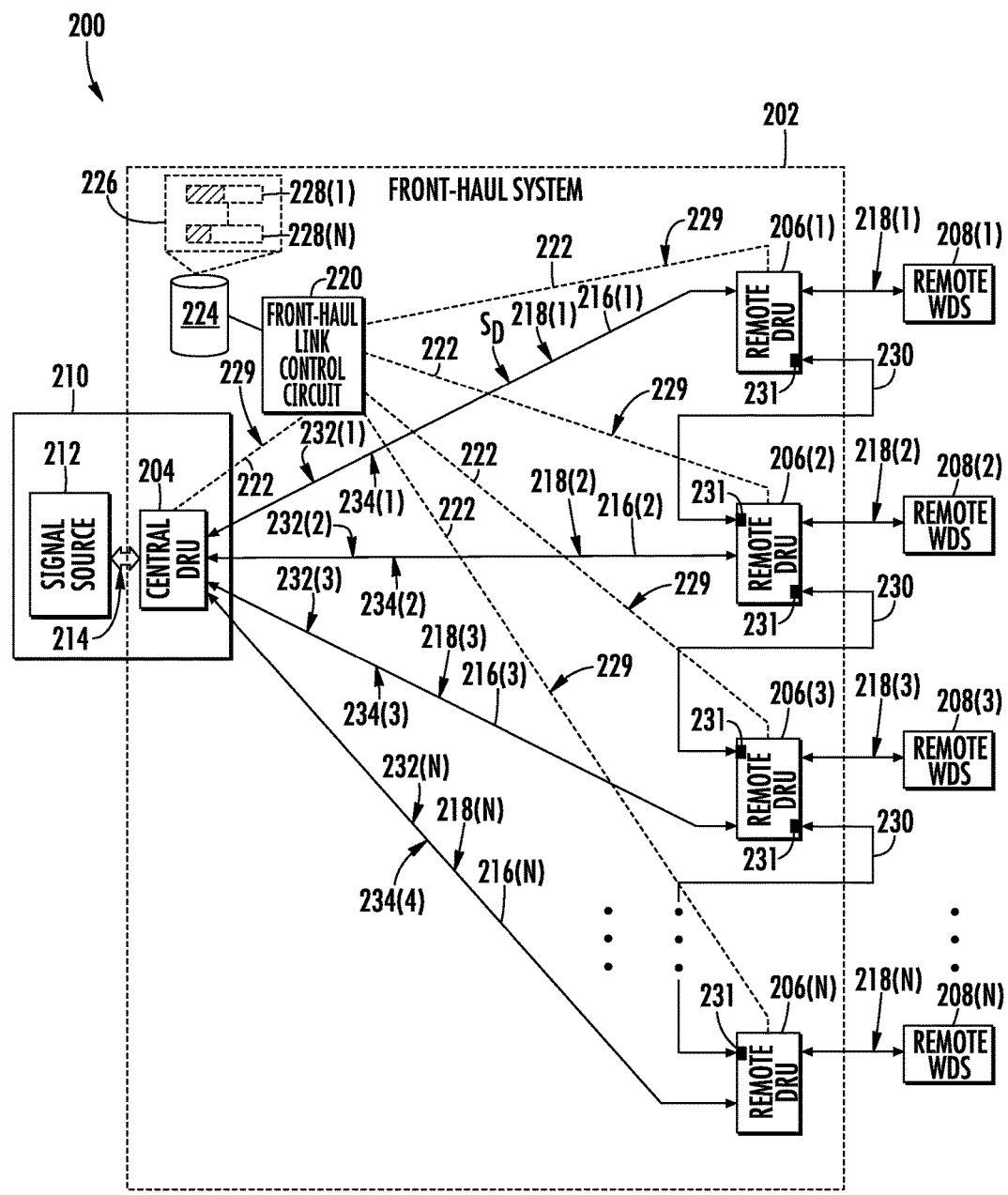
FIG. 2 is a schematic diagram of an exemplary WDS network in which a front-haul communications system is configured to enable communication service continuity in the WDS network.

In this regard, FIG. 2 is a schematic diagram of an exemplary WDS network 200 that includes a front-haul communications system 202. The front-haul communications system 202 is configured to provide communication service continuity in the WDS network 200. As further discussed below, the front-haul communications system 202 detects a failed front-haul communication link(s) and reroutes a disrupted communication service(s), which is configured to be communicated over the failed front-haul communication link(s), to a remaining operational front-haul communication link(s). The front-haul communications system 202 is configured to reroute the disrupted communication service(s) based on bandwidth capacity requirement (e.g., peak data rate, average data rate, etc.) of the disrupted communication service(s) and unused bandwidth capacity of the operational front-haul communication link(s). As such, the front-haul communications system 202 enables communication service continuity in the WDS network 200, thus enhancing efficiency and performance of the WDS network 200.

With reference to FIG. 2, the front-haul communications system 202 in this example includes a central DRU 204 and a plurality of remote DRUs 206(1)-206(N). The remote DRUs 206(1)-206(N) are communicatively coupled to a plurality of remote WDSs 208(1)-208(N), which can be remote DASs, for example. In a non-limiting example, each of the remote WDSs 208(1)-208(N) is deployed in a building(s) to provide a communication service(s) with sufficient radio frequency (RF) coverage to the building(s). In this regard, the WDS network 200 may be deployed to provide the communication service(s) in university campuses and/or large corporate sites, for example.

In a non-limiting example, the communication service(s) is defined herein as a cellular wireless connectivity service, which is provided at certain frequency band using certain technology. The communication service(s) may include several channels. For example, the communication service(s) may be a cellular wireless connectivity at band twelve (12) (e.g., downlink channel 728-746 MHz) using long-term evolution (LTE) technology. The communication service(s) may include three (3) five (5) MHz downlink channels (e.g., a 728-733 MHz channel, a 733-738 MHz channel, and a 740-745 MHz channel).

In a non-limiting example, the central DRU 204 is provided in a signal source base 210. The signal source base 210 may be a facility hosting one or more signal sources 212. The signal sources 212 may be digital baseband units (BBUs) configured to communicate one or more digital baseband communications signals 214 with the central DRU 204. The digital baseband communications signals 214 may be communicated according to a variety of communication protocols, including a common public radio interface (CPRI) protocol, an open base station architecture initiative (OBSAI) protocol, an open radio equipment interface (ORI) protocol, and/or other standard or proprietary protocols, for example.

The central DRU 204 is communicatively coupled to the remote DRUs 206(1)-206(N) by a plurality of front-haul communication links 216(1)-216(N). Although each of the front-haul communication links 216(1)-216(N) is drawn as a single line, it shall be appreciated that each of the front-haul communication links 216(1)-216(N) is a bidirectional communication link. In this regard, each of the front-haul communication links 216(1)-216(N) can be configured to provide a downlink communication link and an uplink communication link. In a non-limiting example, each of the front-haul communication links 216(1)-216(N) can be partitioned to provide the downlink communication link and the uplink communication link based on separate physical media or data multiplexing. The central DRU 204 is configured to communicate a plurality of digital communications signals 218(1)-218(N) with the remote DRUs 206(1)-206(N) over the front-haul communication links 216(1)-216(N). The front-haul communication links 216(1)-216(N) may be provided by optical fiber-based communication mediums and/or Ethernet-based communication mediums, for example. As such, the front-haul communication links 216(1)-216(N) may each include physical media (e.g., optical fibers or conductive wires) for carrying the digital communications signals 218(1)-218(N) between the central DRU 204 and the remote DRUs 206(1)-206(N). The maximum bandwidth capacity provided by each of the front-haul communication links 216(1)-216(N) is determined by the physical media in the front-haul communication links 216(1)-216(N).

Figure 3:
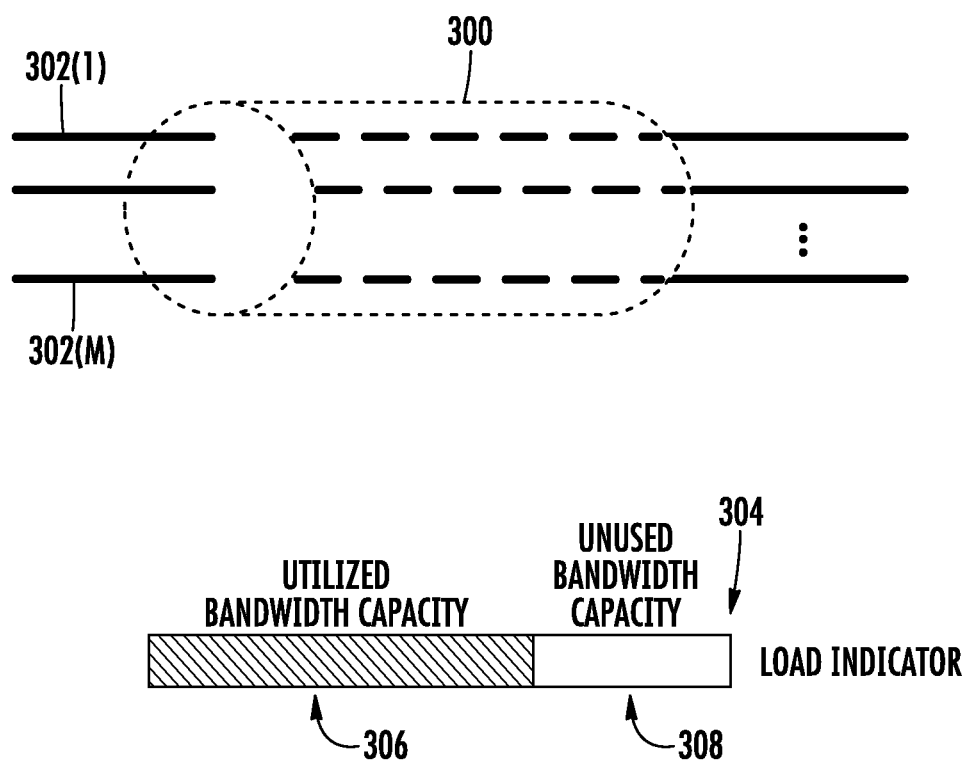
FIG. 3 is a schematic diagram of an exemplary communication medium that can be deployed in the front-haul communications system of FIG. 2 to provide front-haul communication links.

In this regard, FIG. 3 is a schematic diagram of an exemplary communication medium 300 that can be deployed in the front-haul communications system 202 of FIG. 2 to provide the front-haul communication links 216(1)-206(N). The communication medium 300 includes a plurality of physical channels 302(1)-302(M), which corresponds to a plurality of optical fibers or conductive wires, for example. Each of the physical channels 302(1)-302(M) has a predefined bandwidth capacity. For example, if the communication medium 300 includes one thousand (1000) physical channels, and each physical channel has the predefined bandwidth capacity of one hundred megabits per second (100 Mbps), then the communication medium 300 will have a maximum bandwidth capacity of 100 gigabits per second (100 Gbps). In this regard, if the communication medium 300 is provided in the WDS network 200 of FIG. 2 to enable the front-haul communication link 216(1), and the digital communications signal 218(1) is communicated over seven hundred (700) of the 1000 physical channels, the communication medium 300 then has seventy percent (70%) utilized bandwidth capacity. As such, three hundred (300) of the 1000 physical channels are unused. Therefore, the communication medium 300 has thirty percent (30%) unused bandwidth capacity.

With continued reference to FIG. 3, a load indicator 304 can be employed to keep track of bandwidth capacity utilization of the communication medium 300. In a non-limiting example, the load indicator 304 includes a utilized bandwidth capacity indicator 306 and an unused bandwidth capacity indicator 308. In this regard, in the above example, the utilized bandwidth capacity indicator 306 and the unused bandwidth capacity indicator 308 indicate the 70% utilized bandwidth capacity and the 30% unused bandwidth capacity, respectively.

With reference back to FIG. 2, the front-haul communications system 202 includes a front-haul link control circuit 220 that is communicatively coupled to central DRU 204 and the remote DRUs 206(1)-206(N) over logical links 222, which may be enabled by the front-haul communication links 216(1)-216(N) and/or alternative communication links (not shown). In a non-limiting example, the front-haul link control circuit 220 is a general-purpose processor, a microprocessor, or a microcontroller. In another non-limiting example, the front-haul link control circuit 220 is a microprocessor or a microcontroller. The front-haul link control circuit 220 is configured to track bandwidth capacity utilizations of the front-haul communication links 216(1)-216(N). The front-haul link control circuit 220 is communicatively coupled to a storage medium 224 (e.g., memory, register, etc.). Therefore, in a non-limiting example, the front-haul link control circuit 220 can track the bandwidth capacity utilizations of the front-haul communication links 216(1)-216(N) by creating and storing a load indicator map 226 in the storage medium 224. The load indicator map 226 includes a plurality of load indicators 228(1)-228(N), each configured according to the load indicator 304 of FIG. 3. As such, each of the load indicators 228(1)-228(N) includes the utilized bandwidth capacity indicator 306 and the unused bandwidth capacity indicator 308 for indicating the utilized bandwidth capacity and the unused bandwidth capacity of a respective front-haul communication link 216.

In a non-limiting example, the front-haul link control circuit 220 communicates with the remote DRUs 206(1)-206(N) over the logical links 222 to determine the utilized bandwidth capacity and the unused bandwidth capacity for each the front-haul communication links 216(1)-216(N). By creating and maintaining the load indicator map 226, the front-haul link control circuit 220 is able to keep track of the utilized bandwidth capacity and the unused bandwidth capacity for each of the front-haul communication links 216(1)-216(N).

With continuing reference to FIG. 2, the digital communications signals 218(1)-218(N) communicated on the front-haul communication links 216(1)-216(N) are each associated with at least one communication service. For example, the digital communications signal 218(1) is associated with a long-term evolution (LTE) communication service from a first service provider, the digital communications signal 218(2) is associated with the LTE communication service from a second provider, the digital communications signal 218(3) is also associated with the LTE communication service from the first service provider, and the digital communications signal 218(N) is associated with a Wi-Fi communication service.

A front-haul communication link among the front-haul communication links 216(1)-216(N) may fail at times due to a variety of causes (e.g., damage to the underlying physical media) (hereinafter referred to as "failed front-haul communication link 216"). As a result, the failed front-haul communication link 216 may be unable to communicate a digital communications signal 218, which is among the digital communications signals 218(1)-218(N), configured to be communicated on the failed front-haul communication link 216. Consequently, the communication service associated with the digital communications signal 218 may be disrupted, which is hereinafter referred to as a "disrupted communication service $S_D$." In contrast, a front-haul communication link among the front-haul communication links 216(1)-216(N) is referred to as an "operational front-haul communication link" if communication services associated with the front-haul communication link is uninterrupted.

As such, the front-haul link control circuit 220 is configured to detect the failed front-haul communication link 216 that is unable to communicate the digital communications signal 218 configured to be communicated on the failed front-haul communication link 216. In a non-limiting example, the front-haul link control circuit 220 detects the failed front-haul communication link 216 based on feedback message(s) 229 received from the central DRU 204 and/or the remote DRUs 206(1)-206(N) via the logical links 222. In another non-limiting example, the front-haul link control circuit 220 detects the failed front-haul communication link 216 by interrogating the central DRU 204 and/or the remote DRUs 206(1)-206(N) over the logical links 222 periodically. The front-haul link control circuit 220 may keep track of the status (e.g., failed or operational) of the front-haul communication links 216(1)-216(N) in a link status database (not shown) stored in the storage medium 224.

In response to detecting the failed front-haul communication link 216, the front-haul link control circuit 220 is configured to determine at least one bandwidth capacity requirement $BW_R$ (e.g., peak data rate, average data rate, etc.) of the disrupted communication service $S_D$ associated with the digital communications signal 218 communicated on the failed front-haul communication link 216. In a non-limiting example, the front-haul link control circuit 220 determines the bandwidth capacity requirement $BW_R$ of the disrupted communication service $S_D$ based on a respective load indicator 228 in the load indicator map 226.

Upon determining the bandwidth capacity requirement $BW_R$ of the disrupted communication service $S_D$, the front-haul link control circuit 220 identifies at least one operational front-haul communication link among the front-haul communication links 216(1)-216(N) that has unused bandwidth capacity $BW_U$. In a non-limiting example, the front-haul link control circuit 220 identifies the operational front-haul communication links based on status information stored in the link status database. Upon identifying the operational front-haul communication links having the unused bandwidth capacity $BW_U$, the front-haul link control circuit 220 further determines whether the unused bandwidth capacity $BW_U$ is sufficient to accommodate the bandwidth capacity requirement $BW_R$. Accordingly, it is necessary for the front-haul link control circuit 220 to determine that the unused bandwidth capacity $BW_U$ is greater than or equal to the bandwidth capacity requirement $BW_R$. As such, the aggregated throughput of the identified operational front-haul communication link will not exceed the maximum bandwidth capacity (e.g., peak throughput) of the identified operational front-haul communication link. The aggregated throughput refers to throughput required to deliver an operational communication service (not shown) configured to be delivered over the identified operational front-haul communication link plus the disrupted communication service $S_D$. In a non-limiting example, multiple operational front-haul communication links among the front-haul communication links 216(1)-216(N) can have the unused bandwidth capacity $BW_U$. In this regard, the front-haul link control circuit 220 may take into consideration the maximum data rate that can be delivered by each of the multiple front-haul communication links having the unused bandwidth capacity $BW_U$. The front-haul link control circuit 220 is further configured to reroute the disrupted communication service $S_D$ to the identified operational front-haul communication link based on the unused bandwidth capacity $BW_U$ of the identified operational front-haul communication link and the bandwidth capacity requirement $BW_R$ of the disrupted communication service $S_D$. By detecting the failed front-haul communication link 216 and rerouting the disrupted communication service $S_D$, which is associated with the digital communications signal 218 communicated on the failed front-haul communication link 216, to the identified operational front-haul communication link having the unused bandwidth capacity $BW_U$, it is possible to enable communication service continuity in the WDS network 200, thus enhancing efficiency and performance of the WDS network 200.

For the convenience of reference and illustration, in a non-limiting example, the front-haul communication links 216(1)-216(2) are hereinafter referred to as the failed front-haul communication link 216(1) and the operational front-haul communication link 216(2). Accordingly, the remote DRUs 206(1)-206(2) are hereinafter referred to as the disrupted remote DRU 206(1) and the operational remote DRU 206(2). It shall be appreciated that the methods and configurations discussed with reference to the front-haul communication links 216(1)-216(2) for enabling communication service continuity in the WDS network 200 are applicable to each of the front-haul communication links 216(1)-216(N).

Figure 4:
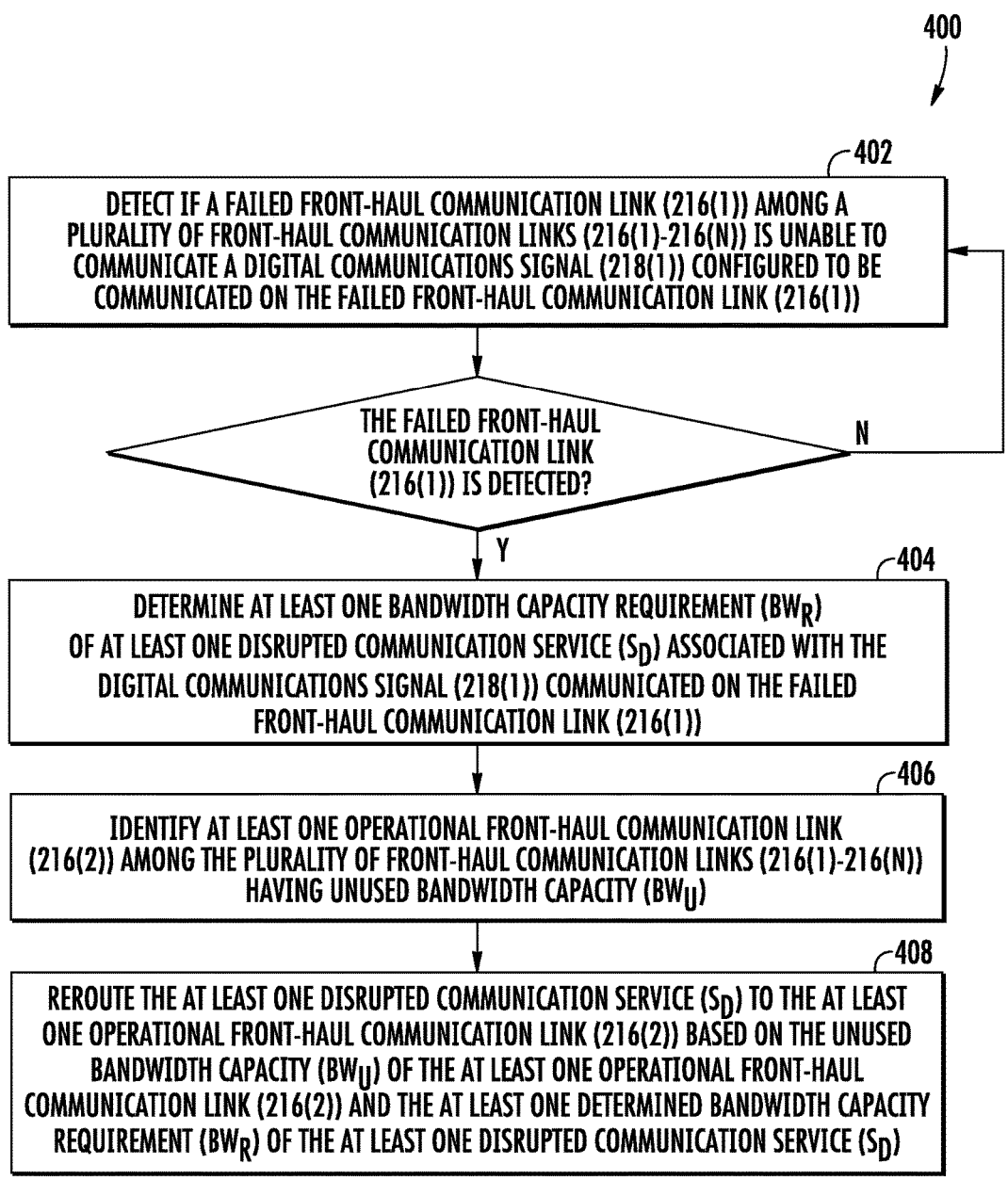
FIG. 4 is a flowchart of an exemplary process of the front-haul communications system of FIG. 2 for enabling communication service continuity in the WDS network.

The front-haul link control circuit 220 is configured to enable communication service continuity in the WDS network 200 according to a process. In this regard, FIG. 4 is a flowchart of an exemplary process 400 of the front-haul communications system 202 for enabling communication service continuity in the WDS network 200. The discussion of the exemplary process 400 in FIG. 4 is in reference to the front-haul communications system 202 in FIG. 2.

With reference to FIG. 4, the front-haul link control circuit 220 detects if the failed front-haul communication link 216(1) among the front-haul communication links 216(1)-216(N) is unable to communicate the digital communications signal 218(1) configured to be communicated on the failed front-haul communication link 216(1) (block 402). If the failed front-haul communication link 216(1) is not detected, the front-haul link control circuit 220 repeats the process step in block 402 until the failed front-haul communication link 216(1) is detected. If the failed front-haul communication link 216(1) is detected, the front-haul link control circuit 220 determines the bandwidth capacity requirement $BW_R$ of the disrupted communication service $S_D$ associated with the digital communications signal 218(1) communicated on the failed front-haul communication link 216(1) (block 404). Next, the front-haul link control circuit 220 identifies the operational front-haul communication link 216(2) among the front-haul communication links 216(1)-216(N) having the unused bandwidth capacity $BW_U$ (block 406). Subsequently, the front-haul link control circuit 220 reroutes the disrupted communication service $S_D$ to the operational front-haul communication link 216(2) based on the unused bandwidth capacity $BW_U$ of the operational front-haul communication link 216(2) and the determined bandwidth capacity requirement $BW_R$ of the disrupted communication service $S_D$ (block 408).

With reference back to FIG. 2, the remote DRUs 206(1)-206(N) in this example are daisy-chained (e.g., disposed according to a serial arrangement) by an inter-remote DRU communication link 230. In this regard, the inter-remote DRU communication link 230 enables the remote DRUs 206(1)-206(N) to communicate with each other. In a non-limiting example, the inter-remote DRU communication link 230 daisy-chains the remote DRUs 206(1)-206(N) via interface ports 231 in the remote DRUs 206(1)-206(N). In this regard, the remote DRUs 206(1)-206(N) are able to communicate with each other, either directly or indirectly, via the inter-remote DRU communication link 230. For example, the disrupted remote DRU 206(1) is able to communicate directly with the remote DRU 206(2) via the inter-remote DRU communication link 230. However, the disrupted remote DRU 206(1) is only able to communicate with the remote DRU 206(3) through the remote DRU 206(2). As such, the disrupted remote DRU 206(1) is able to communicate indirectly with the remote DRU 206(3). In this regard, when the front-haul link control circuit 220 reroutes the disrupted communication service $S_D$ to the operational front-haul communication link 216(2), the remote DRU 206(2) is able to receive the disrupted communication service $S_D$ via the operational front-haul communication link 216(2). The remote DRU 206(2) can then provide the disrupted communication service $S_D$ to the disrupted remote DRU 206(1) via the inter-remote DRU communication link 230.

Figure 5:
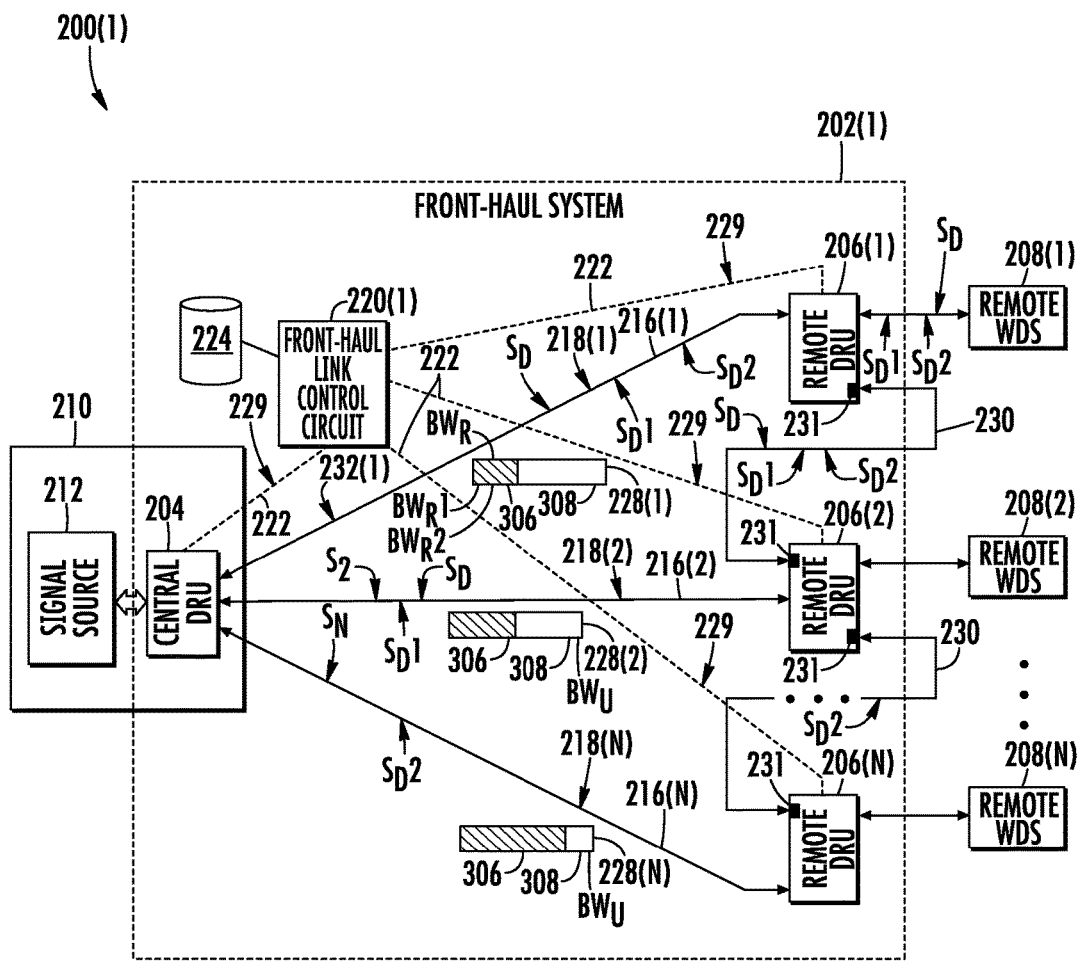
FIG. 5 is a schematic diagram of an exemplary WDS network in which a front-haul communications system is configured to enable communication service continuity in the WDS network by rerouting a disrupted communication service to an operational front-haul communication link having sufficient unused bandwidth capacity for communicating the disrupted communication service.

According to exemplary aspects discussed above, the front-haul link control circuit 220 reroutes the disrupted communication service $S_D$ associated with the digital communications signal 218(1) to the operational front-haul communication link 216(2) based on the unused bandwidth capacity $BW_U$ of the operational front-haul communication link 216(2) and the determined bandwidth capacity requirement $BW_R$ of the disrupted communication service $S_D$. To be able to reroute the disrupted communication service $S_D$ to the operational front-haul communication link 216(2), the unused bandwidth capacity $BW_U$ of the operational front-haul communication link 216(2) may be required to be greater than the bandwidth capacity requirement $BW_R$ of the disrupted communication service $S_D$ ($BW_U > BW_R$). Alternatively, the unused bandwidth capacity $BW_U$ of the operational front-haul communication link 216(2) may be required to be equal to the bandwidth capacity requirement $BW_R$ of the disrupted communication service $S_D$ ($BW_U = BW_R$). In this regard, FIG. 5 is a schematic diagram of an exemplary WDS network 200(1) in which a front-haul communications system 202(1) is configured to enable communication service continuity in the WDS network 200(1) by rerouting the disrupted communication service $S_D$ of FIG. 2 to the operational front-haul communication link 216(2) having sufficient unused bandwidth capacity $BW_U$ for communicating the disrupted communication service $S_D$. Common elements between FIGS. 2, 3, and 5 are shown therein with common element numbers and will not be re-described herein.

With reference to FIG. 5, in this example, a front-haul link control circuit 220(1) in the front-haul communications system 202(1) detects the failed front-haul communication link 216(1). Based on the utilized bandwidth capacity indicator 306 in the load indicator 228(1), which corresponds to the failed front-haul communication link 216(1) according to previous discussions, the front-haul link control circuit 220(1) can determine the bandwidth capacity requirement $BW_R$ for the disrupted communication service $S_D$. Likewise, based on the unused bandwidth capacity indicator 308 in the load indicator 228(2), which corresponds to the operational front-haul communication link 216(2), the front-haul link control circuit 220(1) can determine the unused bandwidth capacity $BW_U$ of the operational front-haul communication link 216(2). In a non-limiting example, the unused bandwidth capacity $BW_U$ of the operational front-haul communication link 216(2) is determined to be greater than or equal to the bandwidth capacity requirement $BW_R$ of the disrupted communication service $S_D$. As a result, the front-haul link control circuit 220(1) configures the central DRU 204 and the remote DRU 206(2) to reroute the disrupted communication service $S_D$ to the operational front-haul communication link 216(2). The front-haul link control circuit 220(1) is further configured to update the load indicator 228(1) and the load indicator 228(2). Accordingly, the utilized bandwidth capacity indicator 306 and the unused bandwidth capacity indicator 308 in the load indicator 228(1) are set to zero percent (0%) and one hundred percent (100%), respectively. The utilized bandwidth capacity indicator 306 in the load indicator 228(2) is updated to include the bandwidth capacity requirement $BW_R$ of the disrupted communication service $S_D$. The unused bandwidth capacity indicator 308 in the load indicator 228(2) is also updated to subtract the bandwidth capacity requirement $BW_R$ of the disrupted communication service $S_D$.

If the disrupted communication service $S_D$ is a downlink communication service, the remote DRU 206(2) is configured to receive the disrupted communication service $S_D$ in addition to a respective communication service $S_2$ configured to be communicated on the operational front-haul communication link 216(2). The remote DRU 206(2) is configured to provide the disrupted communication service $S_D$ to the disrupted remote DRU 206(1) via the inter-remote DRU communication link 230. In this regard, the inter-remote DRU communication link 230 between the remote DRU 206(2) and the disrupted remote DRU 206(1) needs to have sufficient unused bandwidth capacity to accommodate the bandwidth capacity requirement $BW_R$ of the disrupted communication service $S_D$. In a non-limiting example, the front-haul link control circuit 220(1) maintains one or more inter-remote DRU load indicators (not shown) in the storage medium 224. The disrupted remote DRU 206(1) subsequently provides the disrupted communication service $S_D$ to the remote WDS 208(1).

If the disrupted communication service $S_D$ is an uplink communication service, the disrupted remote DRU 206(1) receives the disrupted communication service $S_D$ from the remote WDS 208(1). The disrupted remote DRU 206(1) provides the disrupted communication service $S_D$ to the remote DRU 206(2) via the inter-remote DRU communication link 230. The remote DRU 206(2) then communicates the disrupted communication service $S_D$ with the respective communication service $S_2$ over the operational front-haul communication link 216(2).

With continuing reference to FIG. 5, in a non-limiting example, the disrupted communication service $S_D$ includes at least one first disrupted communication service $S_D1$ and at least one second disrupted communication service $S_D2$. Accordingly, the utilized bandwidth capacity indicator 306 in the load indicator 228(1) indicates a first bandwidth capacity requirement $BW_R1$ and a second bandwidth capacity requirement $BW_R2$ for the first disrupted communication service $S_D1$ and the second disrupted communication service $S_D2$, respectively. However, the unused bandwidth capacity $BW_U$ of the operational front-haul communication link 216(2) is only sufficient for the first bandwidth capacity requirement $BW_R1$ of the first disrupted communication service $S_D1$. The front-haul link control circuit 220(1) may determine that the front-haul communication link 216(N) is also operational. Further, the front-haul link control circuit 220(1) may determine that an unused bandwidth capacity $BW_U$ of the operational front-haul communication link 216(N) is sufficient for the second bandwidth capacity requirement $BW_R2$ of the second disrupted communication service $S_D2$. In this regard, the front-haul link control circuit 220(1) may reroute the first disrupted communication service $S_D1$ and the second disrupted communication service $S_D2$ to the operational front-haul communication link 216(2) and the operational front-haul communication link 216(N), respectively.

The remote DRU 206(N) receives the second disrupted communication service $S_D2$ via the front-haul communication link 216(N) and provides the second disrupted communication service $S_D2$ to the remote DRU 206(2) via the inter-remote DRU communication link 230. The remote DRU 206(2) also receives the first disrupted communication service $S_D1$ via the operational front-haul communication link 216(2) and the second disrupted communication service $S_D2$ via the inter-remote DRU communication link 230. The remote DRU 206(2) provides the first disrupted communication service $S_D1$ and the second disrupted communication service $S_D2$ to the disrupted remote DRU 206(1) via the inter-remote DRU communication link 230.

In some cases, the front-haul link control circuit 220(1) may discover that neither the operational front-haul communication link 216(2) nor the operational front-haul communication link 216(N) has the unused bandwidth capacity $BW_U$ to accommodate the bandwidth capacity requirement $BW_R$ of the disrupted communication service $S_D$. Accordingly, the front-haul link control circuit 220(1) may reconfigure the disrupted communication service $S_D$ to reduce the bandwidth capacity requirement $BW_R$ of the disrupted communication service $S_D$.

Figure 6:
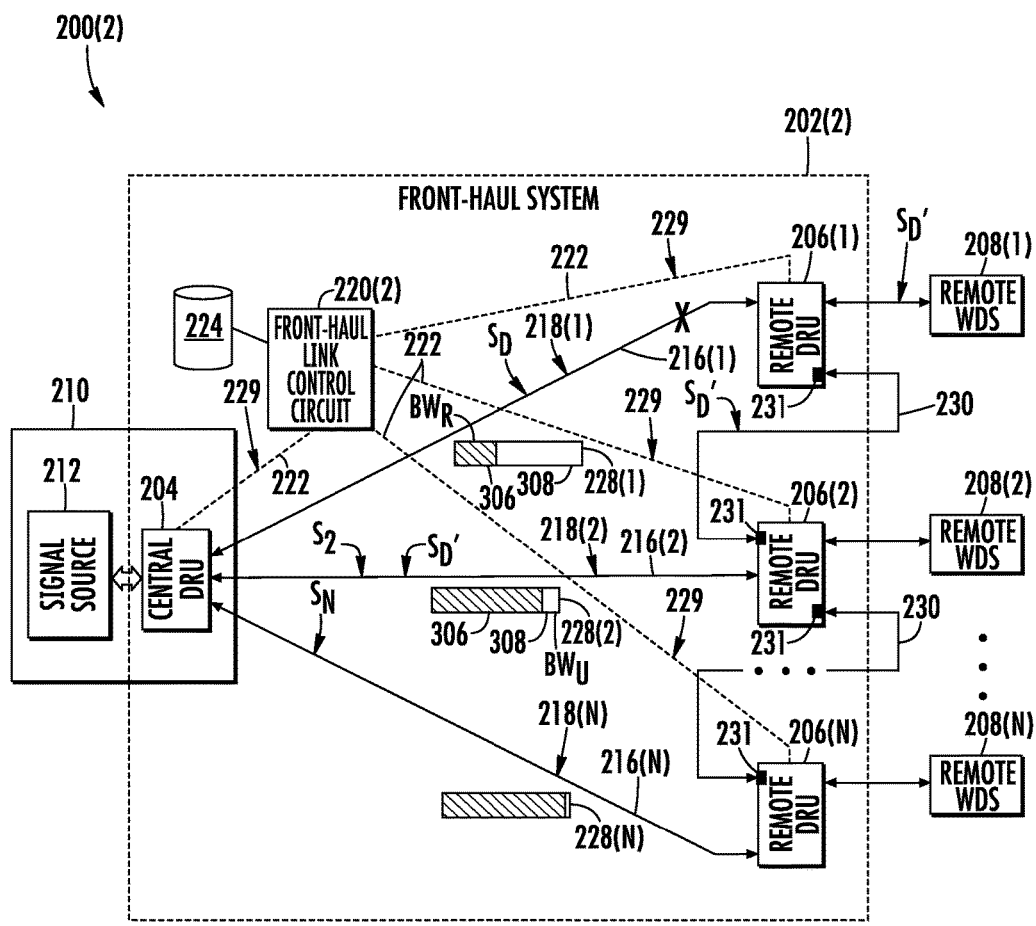
FIG. 6 is a schematic diagram of an exemplary WDS network in which a front-haul communications system is configured to enable communication service continuity in the WDS network by reducing a bandwidth capacity requirement of a disrupted communication service before rerouting the disrupted communication service to an operational front-haul communication link.

In this regard, FIG. 6 is a schematic diagram of an exemplary WDS network 200(2) in which a front-haul communications system 202(2) is configured to enable communication service continuity in the WDS network 200(2) by reducing the bandwidth capacity requirement $BW_R$ of the disrupted communication service $S_D$ before rerouting the disrupted communication service $S_D$ to the operational front-haul communication link 216(2). Common elements between FIGS. 2, 3, 5, and 6 are shown therein with common element numbers and will not be re-described herein.

With reference to FIG. 6, in a non-limiting example, a front-haul link control circuit 220(2) in the front-haul communications system 202(2) determines, based on the load indicators 228(1)-228(N), that neither the operational front-haul communication link 216(2) nor the operational front-haul communication link 216(N) has the unused bandwidth capacity $BW_U$ sufficient to communicate the bandwidth capacity requirement $BW_R$ of the disrupted communication service $S_D$. In this regard, the front-haul link control circuit 220(2) is configured to determine whether the remote WDS 208(1) can accept the disrupted communication service $S_D$ at reduced bandwidth capacity requirement. If the remote WDS 208(1) accepts the disrupted communication service $S_D$ at the reduced bandwidth capacity requirement, the front-haul link control circuit 220(2) further determines by how much the bandwidth capacity requirement is reduced. Accordingly, the front-haul link control circuit 220(2) reconfigures the disrupted communication service $S_D$ to generate a reconfigured disrupted communication service $S_D'$ having the reduced bandwidth capacity requirement.

The front-haul link control circuit 220(2) may then determine that the unused bandwidth capacity $BW_U$ of the operational front-haul communication link 216(2) is greater than or equal to the reduced bandwidth capacity requirement of the reconfigured disrupted communication service $S_D'$. As such, the front-haul link control circuit 220(2) reroutes the reconfigured disrupted communication service $S_D'$ to the operational front-haul communication link 216(2).

If the disrupted communication service $S_D$ is a downlink communication service, the remote DRU 206(2) receives the reconfigured disrupted communication service $S_D'$ via the operational front-haul communication link 216(2). The remote DRU 206(2) then provides the reconfigured disrupted communication service $S_D'$ to the disrupted remote DRU 206(1) via the inter-remote DRU communication link 230.

If the disrupted communication service $S_D$ is an uplink communication service, the disrupted remote DRU 206(1) receives the reconfigured disrupted communication service $S_D'$ from the remote WDS 208(1). The disrupted remote DRU 206(1) provides the reconfigured disrupted communication service $S_D'$ to the remote DRU 206(2) via the inter-remote DRU communication link 230. The remote DRU 206(2) then communicates the reconfigured disrupted communication service $S_D'$ over the operational front-haul communication link 216(2).

In some cases, the front-haul link control circuit 220(2) may discover that neither the operational front-haul communication link 216(2) nor the operational front-haul communication link 216(N) has the unused bandwidth capacity $BW_U$ sufficient to communicate the reconfigured disrupted communication service $S_D'$ having the reduced bandwidth capacity requirement. As a result, the front-haul link control circuit 220(2) may reconfigure the respective communication service $S_2$ configured to be communicated on the operational front-haul communication link 216(2) to increase the unused bandwidth capacity $BW_U$ of the operational front-haul communication link 216(2).

Figure 7:
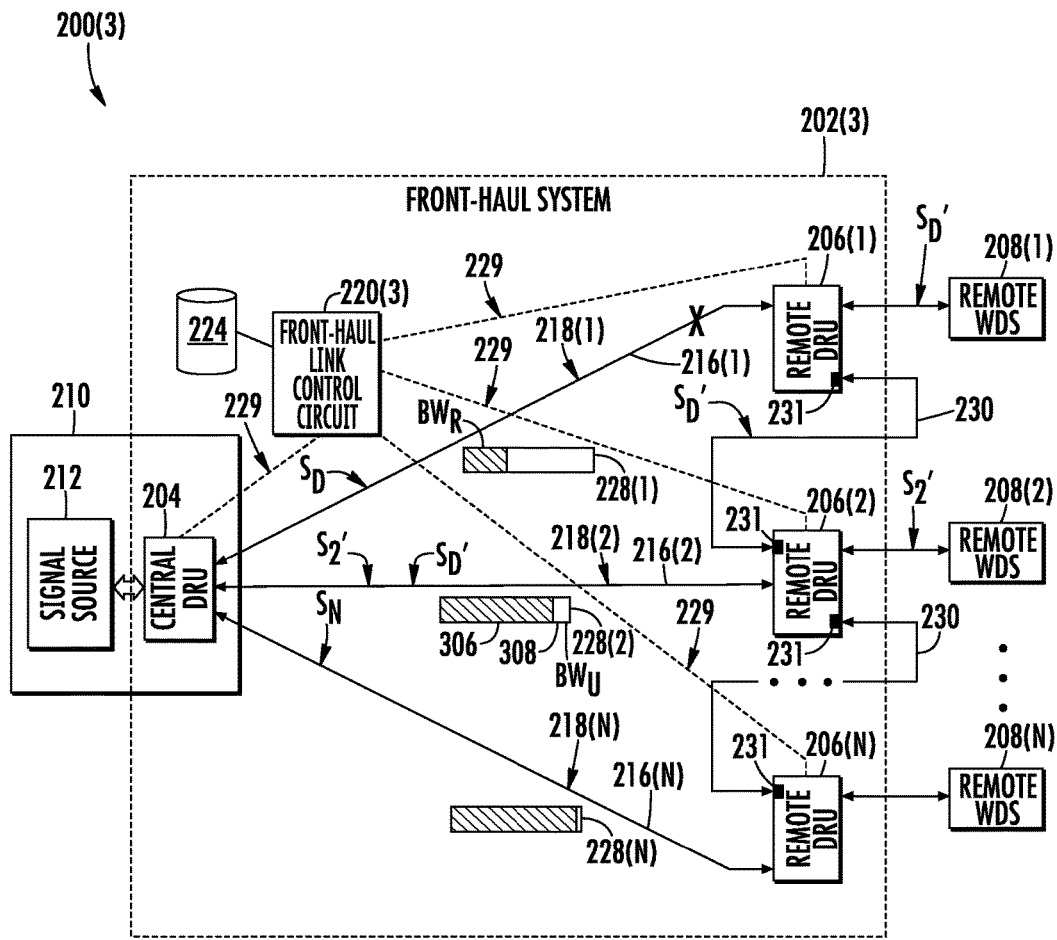
FIG. 7 is a schematic diagram of an exemplary WDS network in which a front-haul communications system is configured to enable communication service continuity in the WDS network by reducing an unused bandwidth capacity of an operational front-haul communication link before rerouting a reconfigured disrupted communication service to the operational front-haul communication link.

In this regard, FIG. 7 is a schematic diagram of an exemplary WDS network 200(3) in which a front-haul communications system 202(3) is configured to enable communication service continuity in the WDS network 200(3) by reducing the unused bandwidth capacity $BW_U$ of the operational front-haul communication link 216(2) before rerouting the reconfigured disrupted communication service $S_D'$ of FIG. 6 to the operational front-haul communication link 216(2). Common elements between FIGS. 2, 3, and 5-7 are shown therein with common element numbers and will not be re-described herein.

With reference to FIG. 7, in a non-limiting example, a front-haul link control circuit 220(3) in the front-haul communications system 202(3) determines, based on the load indicators 228(1)-228(N), that neither the operational front-haul communication link 216(2) nor the operational front-haul communication link 216(N) has the unused bandwidth capacity $BW_U$ sufficient to communicate the reduced bandwidth capacity requirement of the reconfigured disrupted communication service $S_D'$. In this regard, the front-haul link control circuit 220(3) is configured to determine whether the remote WDS 208(2) can accept the respective communication service $S_2$ at a reduced bandwidth capacity requirement. If the remote WDS 208(2) accepts the respective communication service $S_2$ at the reduced bandwidth capacity requirement, the front-haul link control circuit 220(3) further determines by how much the bandwidth capacity requirement is reduced. Accordingly, the front-haul link control circuit 220(3) reconfigures the respective communication service $S_2$ to generate a respective reconfigured communication service $S_2'$ having the reduced bandwidth capacity requirement. As such, the unused bandwidth capacity $BW_U$ of the operational front-haul communication link 216(2) can be increased.

The front-haul link control circuit 220(2) may then determine that the increased unused bandwidth capacity $BW_U$ of the operational front-haul communication link 216(2) is greater than or equal to the reduced bandwidth capacity requirement of the reconfigured disrupted communication service $S_D'$. As such, the front-haul link control circuit 220(3) reroutes the reconfigured disrupted communication service $S_D'$ to the operational front-haul communication link 216(2).

If the disrupted communication service $S_D$ is a downlink communication service, the remote DRU 206(2) receives the reconfigured disrupted communication service $S_D'$ and the respective reconfigured communication service $S_2'$ via the operational front-haul communication link 216(2). The remote DRU 206(2) then provides the reconfigured disrupted communication service $S_D'$ to the disrupted remote DRU 206(1) via the inter-remote DRU communication link 230.

If the disrupted communication service $S_D$ is an uplink communication service, the disrupted remote DRU 206(1) receives the reconfigured disrupted communication service $S_D'$ from the remote WDS 208(1). The disrupted remote DRU 206(1) provides the reconfigured disrupted communication service $S_D'$ to the remote DRU 206(2) via the inter-remote DRU communication link 230. The remote DRU 206(2) then communicates the reconfigured disrupted communication service $S_D'$ and the respective reconfigured communication service $S_2'$ over the operational front-haul communication link 216(2).

Figure 8:
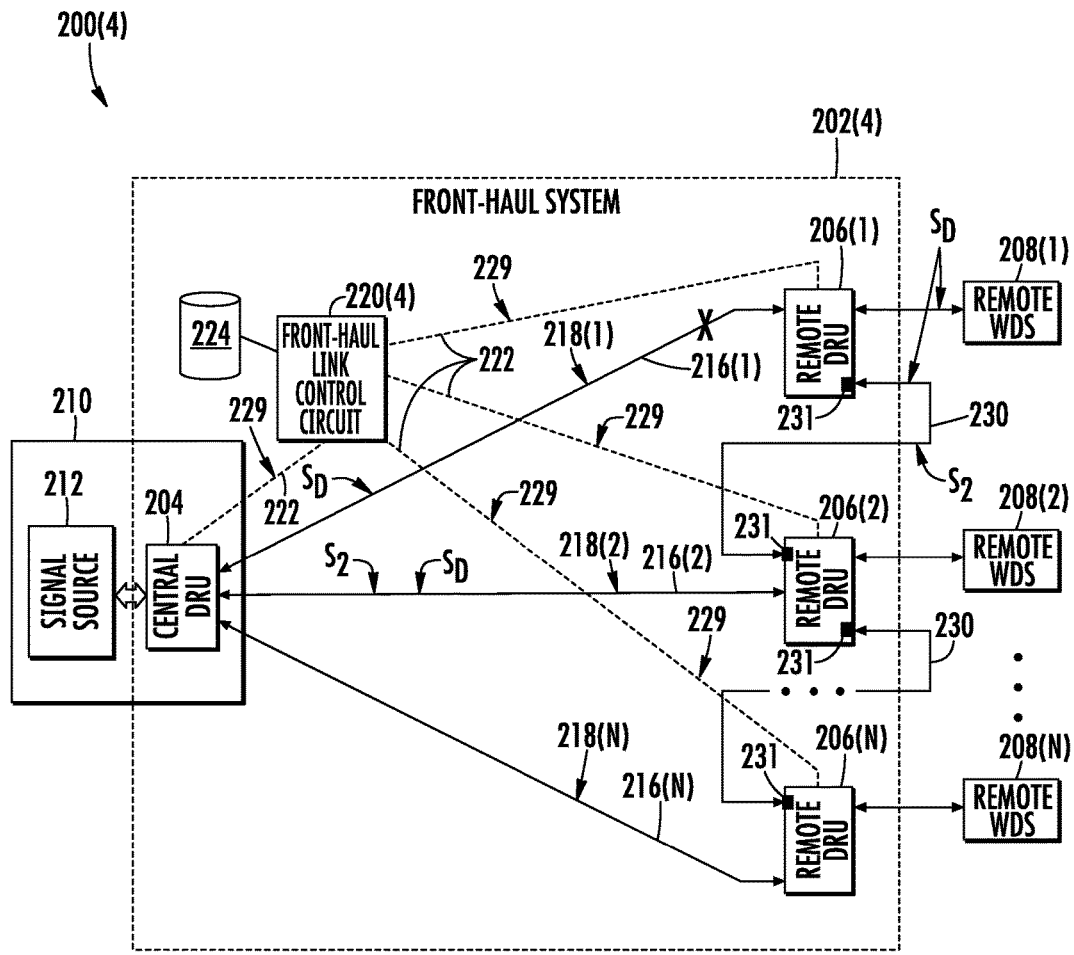
FIG. 8 is a schematic diagram of an exemplary WDS network in which a front-haul communications system is configured to enable communication service continuity in the WDS network by rerouting a disrupted communication service to an operational front-haul communication link configured to communicate a communication service identical to the disrupted communication service.

With reference back to FIG. 5, in a non-limiting example, the respective communication service $S_2$ communicated on the operational front-haul communication link 216(2) is identical to the disrupted communication service $S_D$ communicated on the failed front-haul communication link 216(1). In this regard, FIG. 8 is a schematic diagram of an exemplary WDS network 200(4) in which a front-haul communications system 202(4) is configured to enable communication service continuity in the WDS network 200(4) by rerouting the disrupted communication service $S_D$ of FIG. 5 to the operational front-haul communication link 216(2) configured to communicate the respective communication service $S_2$ that is identical to the disrupted communication service $S_D$. Common elements between FIGS. 2, 3, 5, and 8 are shown therein with common element numbers and will not be re-described herein.

With reference to FIG. 8, in a non-limiting example, a front-haul link control circuit 220(4) in the front-haul communications system 202(4) determines that the respective communication service $S_2$ configured to be communicated on the operational front-haul communication link 216(2) is identical to the disrupted communication service $S_D$. In this regard, if the disrupted communication service $S_D$ is a downlink communication service, the front-haul link control circuit 220(4) configures the remote DRU 206(2) to provide the respective communication service $S_2$ to the disrupted remote DRU 206(1) via the inter-remote DRU communication link 230. The disrupted remote DRU 206(1) then provides the respective communication service $S_2$ as the disrupted communication service $S_D$ to the remote WDS 208(1). If the disrupted communication service $S_D$ is an uplink communication service, the disrupted remote DRU 206(1) receives the disrupted communication service $S_D$ from the remote WDS 208(1). The disrupted remote DRU 206(1) provides the disrupted communication service $S_D$ to the remote DRU 206(2) via the inter-remote DRU communication link 230. The remote DRU 206(2) then communicates the disrupted communication service $S_D$ as the respective communication service $S_2$ over the operational front-haul communication link 216(2). In this regard, cells (not shown) originally configured to provide the respective communication service $S_2$ in a certain geographical area covered by the remote WDS 208(2) are now required to provide the disrupted communication service $S_D$ in a geographical area covered by the remote WDS 208(1). As a result, a neighbor list of the cells may need to be updated to include the geographical area served by the remote WDS 208(1) as well, because defining proper neighbor relations between the cells is required to enable handoff between neighboring cells.

With reference back to FIG. 2, in one non-limiting example, the digital communications signals 218(1)-218(N) are communicated from the central DRU 204 to the remote DRUs 206(1)-206(N) over the front-haul communication links 216(1)-216(N) as a plurality of downlink digital communications signals 232(1)-232(N). In this regard, the remote DRUs 206(1)-206(N) receive and provide the downlink digital communications signals 232(1)-232(N) to the remote WDSs 208(1)-208(N), respectively. In another non-limiting example, the digital communications signals 218(1)-218(N) are communicated from the remote DRUs 206(1)-206(N) over the front-haul communication links 216(1)-216(N) as a plurality of uplink digital communications signals 234(1)-234(N). In this regard, the remote DRUs 206(1)-206(N) receive the uplink digital communications signals 234(1)-234(N) from the remote WDSs 208(1)-208(N), respectively, and provide the uplink digital communications signals 234(1)-234(N) to the central DRU 204.

Figure 9:
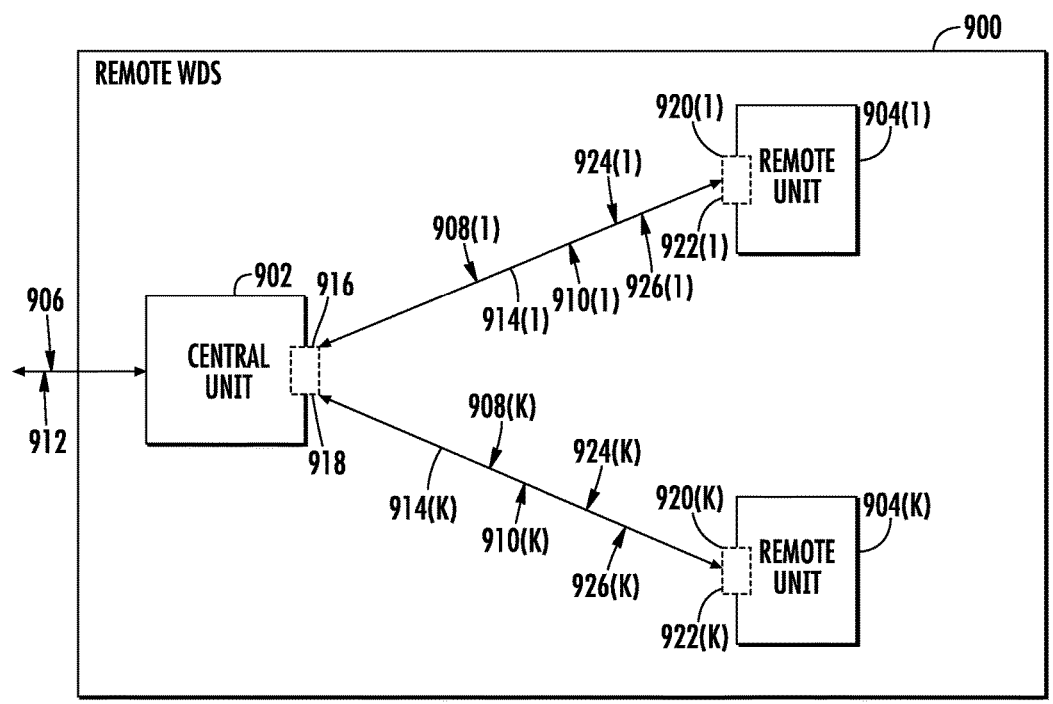
FIG. 9 is a schematic diagram of an exemplary WDS that can be provided in the WDS networks of FIGS. 2 and 5-8.

With continuing reference to FIG. 2, the remote WDSs 208(1)-208(N) may be deployed in a plurality of buildings (not shown) for distributing the downlink digital communications signals 232(1)-232(N) and receiving the uplink digital communications signals 234(1)-234(N), respectively. In this regard, FIG. 9 is a schematic diagram of an exemplary remote WDS 900 that can be provided in the WDS network 200 of FIG. 2, the WDS network 200(1) of FIG. 5, the WDS network 200(2) of FIG. 6, the WDS network 200(3) of FIG. 7, and the WDS network 200(4) of FIG. 8, as any of the remote WDSs 208(1)-208(N). Common elements between FIGS. 2 and 5-9 are shown therein with common element numbers and will not be re-described herein.

With reference to FIG. 9, the remote WDS 900 includes a central unit 902 and a plurality of remote units 904(1)-904(K). The central unit 902 receives a downlink digital communications signal 906, which is among the downlink digital communications signals 232(1)-232(N), from a remote DRU 206 (not shown), which is among the remote DRUs 206(1)-206(N). The central unit 902 then distributes the received downlink digital communications signal 906 to the remote units 904(1)-904(K) as a plurality of downlink signals 908(1)-908(K).

The central unit 902 receives a plurality of uplink signals 910(1)-910(K) from the remote units 904(1)-904(K). The central unit 902 provides the uplink signals 910(1)-910(K) to the remote DRU 206 as an uplink digital communications signal 912, which is among the uplink digital communications signals 234(1)-234(N).

The downlink signals 908(1)-908(K) and the uplink signals 910(1)-910(K) may be communicated over a plurality of optical fiber-based communications mediums 914(1)-914(K), respectively. In this regard, the central unit 902 includes a central unit electrical-to-optical (E/O) converter 916 and a central unit optical-to-electrical (O/E) converter 918. The remote units 904(1)-904(K) include a plurality of remote unit O/E converters 920(1)-920(K) and a plurality of remote unit E/O converters 922(1)-922(K), respectively.

The central unit E/O converter 916 converts the downlink signals 908(1)-908(K) into a plurality of optical downlink signals 924(1)-924(K), respectively. The remote unit O/E converters 920(1)-920(K) in turn convert the optical downlink signals 924(1)-924(K) back into the downlink signals 908(1)-908(K), respectively. The remote unit E/O converters 922(1)-922(K) convert the uplink signals 910(1)-910(K) into a plurality of optical uplink signals 926(1)-926(K), respectively. The central unit O/E converter 918 in turn converts the optical uplink signals 926(1)-926(K) back into the uplink signals 910(1)-910(K), respectively.

Figure 10:
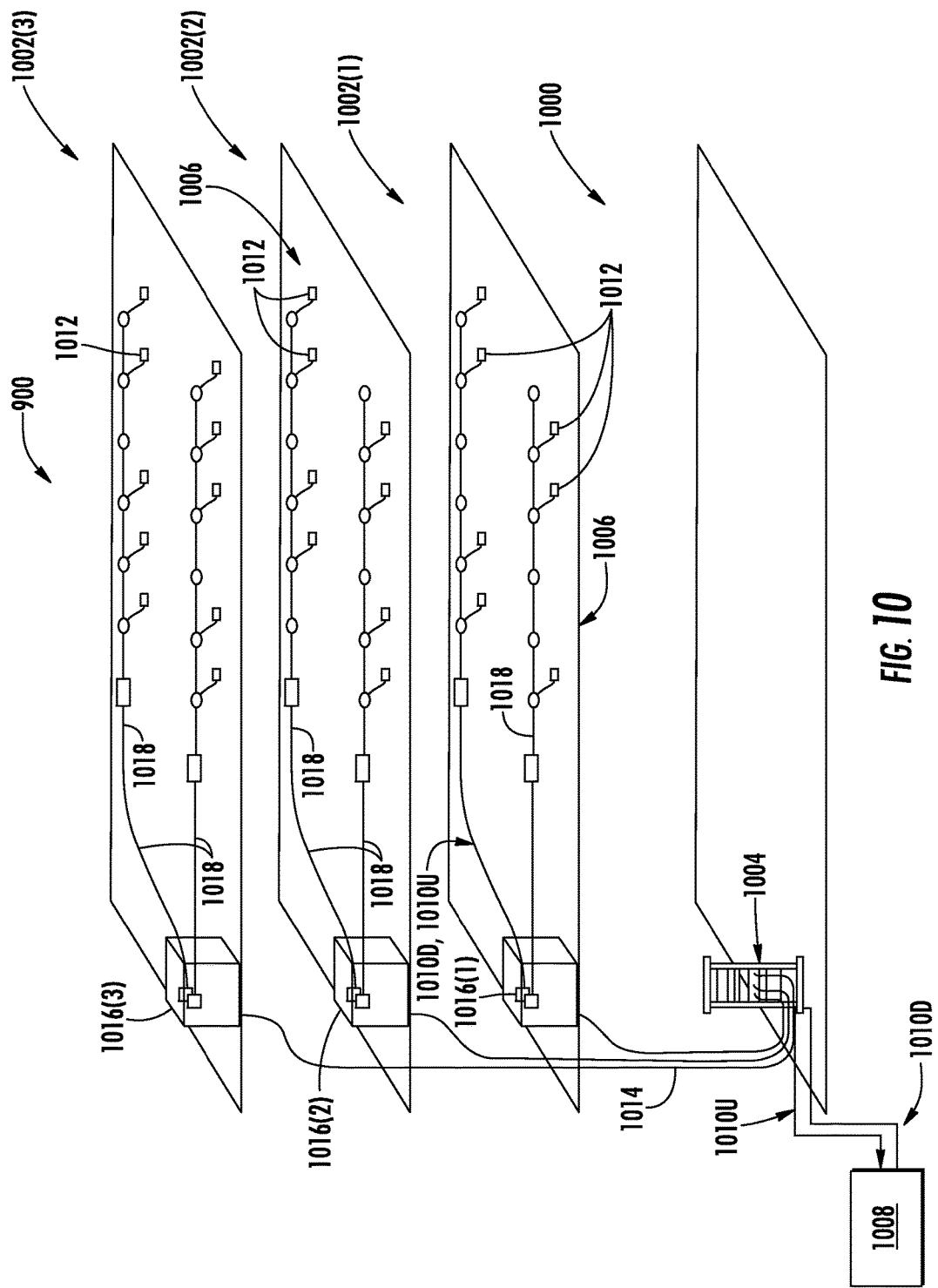
FIG. 10 is a partial schematic cut-away diagram of an exemplary building infrastructure in which the WDS of FIG. 9 can be provided.

The remote WDS 900 of FIG. 9 may be provided in an indoor environment, as illustrated in FIG. 10. FIG. 10 is a partial schematic cut-away diagram of an exemplary building infrastructure 1000 in which the remote WDS 900 of FIG. 9 can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004, and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

Figure 11:
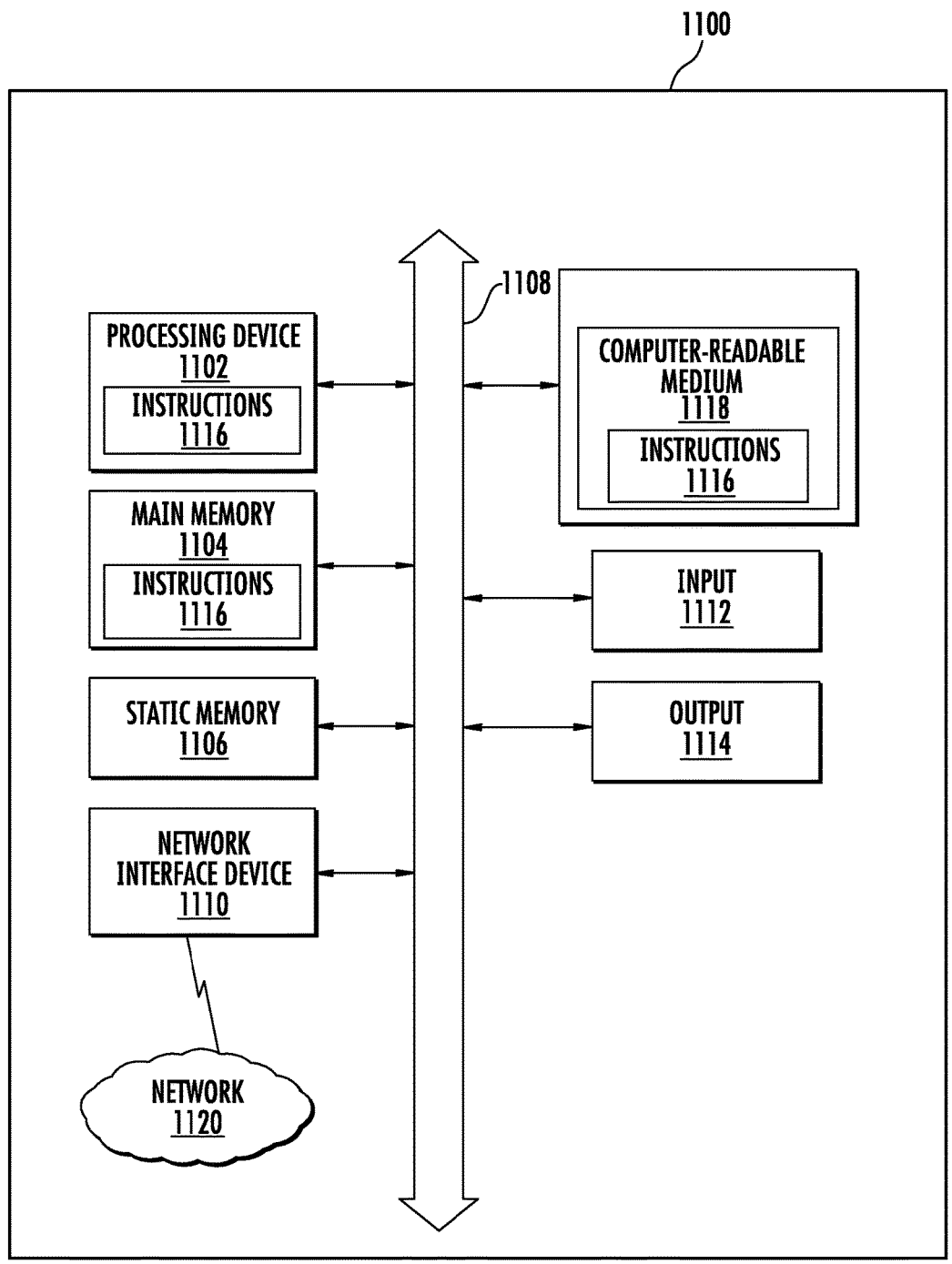
FIG. 11 is a schematic diagram representation of additional detail illustrating an exemplary computer system that could be employed in a control circuit(s) in the front-haul link control circuits of FIGS. 2 and 5-8 for enabling communication service continuity in the WDS networks of FIGS. 2 and 5-8.

FIG. 11 is a schematic diagram representation of additional detail illustrating an exemplary computer system 1100 that could be employed in a control circuit, including the front-haul link control circuit 220 of FIG. 2, the front-haul link control circuit 220(1) of FIG. 5, the front-haul link control circuit 220(2) of FIG. 6, the front-haul link control circuit 220(3) of FIG. 7, and the front-haul link control circuit 220(4) of FIG. 8, for enabling communication service continuity in the WDS network 200 of FIG. 2, the WDS network 200(1) of FIG. 5, the WDS network 200(2) of FIG. 6, the WDS network 200(3) of FIG. 7, and the WDS network 200(4) of FIG. 8. In this regard, the computer system 1100 is adapted to execute instructions from an exemplary computer-readable medium to perform these and/or any of the functions or processing described herein.

In this regard, the computer system 1100 in FIG. 11 may include a set of instructions that may be executed to predict frequency interference to avoid or reduce interference in a multi-frequency DAS. The computer system 1100 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1100 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1100 in this embodiment includes a processing device or processor 1102, a main memory 1104 (e.g., read-only memory (ROM), flash memory, dynamic random access memory (DRAM), such as synchronous DRAM (SDRAM), etc.), and a static memory 1106 (e.g., flash memory, static random access memory (SRAM), etc.), which may communicate with each other via a data bus 1108. Alternatively, the processor 1102 may be connected to the main memory 1104 and/or the static memory 1106 directly or via some other connectivity means.

The processor 1102 may be a controller, and the main memory 1104 or the static memory 1106 may be any type of memory.

The processor 1102 represents one or more general-purpose processing devices, such as a microprocessor, central processing unit, or the like. More particularly, the processor 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1102 is configured to execute processing logic in instructions for performing the operations and steps discussed herein.

The computer system 1100 may further include a network interface device 1110. The computer system 1100 also may or may not include an input 1112, configured to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processor 1102 during execution thereof by the computer system 1100, the main memory 1104 and the processor 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A front-haul communications system in a wireless distribution system (WDS) network, comprising:
    a plurality of remote digital routing units (DRUs) configured to be communicatively coupled to a plurality of remote WDSs;
    a central DRU configured to communicate a plurality of digital communications signals with the plurality of remote DRUs over a plurality of front-haul communication links communicatively coupling the central DRU to the plurality of remote DRUs; and
    a front-haul link control circuit communicatively coupled to the central DRU and the plurality of remote DRUs, the front-haul link control circuit configured to:
        detect if a failed front-haul communication link among the plurality of front-haul communication links is unable to communicate a digital communications signal configured to be communicated on the failed front-haul communication link; and
        in response to detecting the failed front-haul communication link, the front-haul link control circuit is further configured to:
            determine at least one bandwidth capacity requirement of at least one disrupted communication service associated with the digital communications signal communicated on the failed front-haul communication link;
            identify at least one operational front-haul communication link among the plurality of front-haul communication links having unused bandwidth capacity; and
            reroute the at least one disrupted communication service to the at least one operational front-haul communication link among the at least one identified operational front-haul communication link based on the unused bandwidth capacity of the at least one operational front-haul communication link and the at least one determined bandwidth capacity requirement of the at least one disrupted,
    wherein the plurality of remote DRUs are configured to be communicatively daisy-chained together by an inter-remote DRU communication link,
    wherein the front-haul link control circuit is further configured to reduce the at least one bandwidth capacity requirement of the at least one disrupted communication service when the at least one bandwidth capacity requirement of the at least one disrupted communication service is greater than the unused bandwidth capacity of the at least one operational front-haul communication link, and
    wherein the front-haul link control circuit is further configured to reroute the at least one disrupted communication service to the at least one operational front-haul communication link when the unused bandwidth capacity of the at least one operational front-haul communication link is determined to be greater than or equal to the at least one reduced bandwidth capacity requirement of the at least one disrupted communication service.

2. The front-haul communications system of claim 1, wherein the front-haul link control circuit is further configured to reroute the at least one disrupted communication service to the at least one operational front-haul communication link when the unused bandwidth capacity of the at least one operational front-haul communication link is determined to be greater than or equal to the at least one determined bandwidth capacity requirement of the at least one disrupted communication service.

3. The front-haul communications system of claim 2, wherein at least one remote DRU among the plurality of remote DRUs is configured to:
    receive the at least one disrupted communication service via the at least one operational front-haul communication link; and
    provide the at least one disrupted communication service to a disrupted remote DRU coupled to the failed front-haul communication link via the inter-remote DRU communication link.

4. The front-haul communications system of claim 1, wherein at least one remote DRU among the plurality of remote DRUs is configured to:
    receive the at least one disrupted communication service via the at least one operational front-haul communication link; and
    provide the at least one disrupted communication service to a disrupted remote DRU coupled to the failed front-haul communication link via the inter-remote DRU communication link.

5. The front-haul communications system of claim 1, wherein the front-haul link control circuit is further configured to:
    identify the at least one operational front-haul communication link configured to communicate at least one communication service that is identical to the at least one disrupted communication service; and
    configure a remote DRU coupled to the at least one operational front-haul communication link to provide the at least one communication service to a disrupted remote DRU coupled to the failed front-haul communication link via the inter-remote DRU communication link.

6. The front-haul communications system of claim 1, wherein the central DRU is configured to communicate a plurality of downlink digital communications signals with the plurality of remote DRUs over the plurality of front-haul communication links.

7. The front-haul communications system of claim 6, wherein the plurality of downlink digital communications signals is communicated in a protocol selected from the group consisting of: a common public radio interface (CPRI) protocol; an open base station architecture initiative (OBSAI) protocol; an open radio equipment interface (ORI) protocol; and a proprietary protocol.

8. The front-haul communications system of claim 1, wherein the central DRU is configured to communicate a plurality of uplink digital communications signals with the plurality of remote DRUs over the plurality of front-haul communication links.

9. The front-haul communications system of claim 8, wherein the plurality of uplink digital communications signals is communicated in a protocol selected from the group consisting of: a common public radio interface (CPRI) protocol; an open base station architecture initiative (OB-SAI) protocol; an open radio equipment interface (ORI) protocol; and a proprietary protocol.

10. The front-haul communications system of claim 1, wherein the central DRU is configured to communicate a plurality of downlink communications signals and a plurality of uplink communications signals with the plurality of remote DRUs over the plurality of front-haul communication links.

11. A front-haul communications system in a wireless distribution system (WDS) network, comprising:
   a plurality of remote digital routing units (DRUs) configured to be communicatively coupled to a plurality of remote WDSs;
   a central DRU configured to communicate a plurality of digital communications signals with the plurality of remote DRUs over a plurality of front-haul communication links communicatively coupling the central DRU to the plurality of remote DRUs; and
   a front-haul link control circuit communicatively coupled to the central DRU and the plurality of remote DRUs, the front-haul link control circuit configured to:
      detect if a failed front-haul communication link among the plurality of front-haul communication links is unable to communicate a digital communications signal configured to be communicated on the failed front-haul communication link; and
      in response to detecting the failed front-haul communication link, the front-haul link control circuit is further configured to:
         determine at least one bandwidth capacity requirement of at least one disrupted communication service associated with the digital communications signal communicated on the failed front-haul communication link;
         identify at least one operational front-haul communication link among the plurality of front-haul communication links having unused bandwidth capacity; and
         reroute the at least one disrupted communication service to the at least one operational front-haul communication link among the at least one identified operational front-haul communication link based on the unused bandwidth capacity of the at least one operational front-haul communication link and the at least one determined bandwidth capacity requirement of the at least one disrupted communication service,
   wherein the plurality of remote DRUs are configured to be communicatively daisy-chained together by an inter-remote DRU communication link,
   wherein the front-haul link control circuit is further configured to reduce the at least one bandwidth capacity requirement of the at least one disrupted communication service when the at least one bandwidth capacity requirement of the at least one disrupted communication service is greater than the unused bandwidth capacity of the at least one operational front-haul communication link, and
   wherein the front-haul link control circuit is further configured to:
      reduce bandwidth capacity of at least one communication service communicated on the at least one operational front-haul communication link to increase the unused bandwidth capacity of the at least one operational front-haul communication link when the unused bandwidth capacity of the at least one operational front-haul communication link is determined to be less than the at least one reduced bandwidth capacity requirement of the at least one disrupted communication service; and
      reroute the at least one disrupted communication service to the at least one operational front-haul communication link if the increased unused bandwidth capacity of the at least one operational front-haul communication link is determined to be greater than or equal to the at least one reduced bandwidth capacity requirement of the at least one disrupted communication service.

12. The front-haul communications system of claim 11, wherein at least one remote DRU among the plurality of remote DRUs is configured to:
   receive the at least one disrupted communication service via the at least one operational front-haul communication link; and
   provide the at least one disrupted communication service to a disrupted remote DRU coupled to the failed front-haul communication link via the inter-remote DRU communication link.

13. A method for providing communication service continuity in a wireless distribution system (WDS) network, comprising:
   detecting if a failed front-haul communication link among a plurality of front-haul communication links is unable to communicate a digital communications signal configured to be communicated on the failed front-haul communication link;
   in response to detecting the failed front-haul communication link:
      determining at least one bandwidth capacity requirement of at least one disrupted communication service associated with the digital communications signal communicated on the failed front-haul communication link;
      identifying at least one operational front-haul communication link among the plurality of front-haul communication links having unused bandwidth capacity;
      rerouting the at least one disrupted communication service to the at least one operational front-haul communication link based on the unused bandwidth capacity of the at least one operational front-haul communication link and the at least one determined bandwidth capacity requirement of the at least one disrupted communication service;
   communicatively coupling a plurality of remote digital routing units (DRUs) by an inter-remote DRU communication link;
   reducing the at least one bandwidth capacity requirement of the at least one disrupted communication service when the at least one bandwidth capacity requirement of the at least one disrupted communication service is greater than the unused bandwidth capacity of the at least one operational front-haul communication link; and rerouting the at least one disrupted communication service to the at least one operational front-haul communication link when the unused bandwidth capacity of the at least one operational front-haul communication link is determined to be greater than or equal to the at least one reduced bandwidth capacity requirement of the at least one disrupted communication service.

14. The method of claim 13, further comprising rerouting the at least one disrupted communication service to the at least one operational front-haul communication link when the unused bandwidth capacity of the at least one operational front-haul communication link is determined to be greater than or equal to the at least one determined bandwidth capacity requirement of the at least one disrupted communication service.

15. The method of claim 14, further comprising:
receiving the at least one disrupted communication service via the at least one operational front-haul communication link; and
providing the at least one disrupted communication service to a disrupted remote DRU coupled to the failed front-haul communication link via the inter-remote DRU communication link.

16. The method of claim 13, further comprising:
receiving the at least one disrupted communication service via the at least one operational front-haul communication link; and
providing the at least one disrupted communication service to a disrupted remote DRU coupled to the failed front-haul communication link via the inter-remote DRU communication link.

17. The method of claim 13, further comprising:
identifying the at least one operational front-haul communication link configured to communicate at least one communication service that is identical to the at least one disrupted communication service; and
configuring a remote DRU coupled to the at least one operational front-haul communication link to provide the at least one communication service to a disrupted remote DRU coupled to the failed front-haul communication link.

18. A method for providing communication service continuity in a wireless distribution system (WDS) network, comprising:
detecting if a failed front-haul communication link among a plurality of front-haul communication links is unable to communicate a digital communications signal configured to be communicated on the failed front-haul communication link;
in response to detecting the failed front-haul communication link:
determining at least one bandwidth capacity requirement of at least one disrupted communication service associated with the digital communications signal communicated on the failed front-haul communication link;
identifying at least one operational front-haul communication link among the plurality of front-haul communication links having unused bandwidth capacity;
rerouting the at least one disrupted communication service to the at least one operational front-haul communication link based on the unused bandwidth capacity of the at least one operational front-haul communication link and the at least one determined bandwidth capacity requirement of the at least one disrupted communication service;
communicatively coupling a plurality of remote digital routing units (DRUs) by an inter-remote DRU communication link;
reducing the at least one bandwidth capacity requirement of the at least one disrupted communication service when the at least one bandwidth capacity requirement of the at least one disrupted communication service is greater than the unused bandwidth capacity of the at least one operational front-haul communication link;
reducing bandwidth capacity of at least one communication service communicated on the at least one operational front-haul communication link to increase the unused bandwidth capacity of the at least one operational front-haul communication link when the unused bandwidth capacity of the at least one operational front-haul communication link is determined to be lesser than the at least one reduced bandwidth capacity requirement of the at least one disrupted communication service; and
rerouting the at least one disrupted communication service to the at least one operational front-haul communication link if the increased unused bandwidth capacity of the at least one operational front-haul communication link is determined to be greater than or equal to the at least one reduced bandwidth capacity requirement of the at least one disrupted communication service.

19. The method of claim 18, further comprising:
receiving the at least one disrupted communication service via the at least one operational front-haul communication link; and
providing the at least one disrupted communication service to a disrupted remote DRU coupled to the failed front-haul communication link via the inter-remote DRU communication link.

20. A wireless distribution system (WDS) network, comprising:
a plurality of remote WDSs; and
a front-haul communications system, comprising:
a plurality of remote digital routing units (DRUs) communicatively coupled to the plurality of remote WDSs;
a central DRU configured to communicate a plurality of digital communications signals with the plurality of remote DRUs over a plurality of front-haul communication links communicatively coupling the central DRU to the plurality of remote DRUs; and
a front-haul link control circuit communicatively coupled to the central DRU and the plurality of remote DRUs, the front-haul link control circuit configured to:
detect if a failed front-haul communication link among the plurality of front-haul communication links is unable to communicate a digital communications signal configured to be communicated on the failed front-haul communication link; and
in response to detecting the failed front-haul communication link, the front-haul link control circuit is further configured to:

determine at least one bandwidth capacity requirement of at least one disrupted communication service associated with the digital communications signal communicated on the failed front-haul communication link;

identify at least one operational front-haul communication link among the plurality of front-haul communication links having unused bandwidth capacity; and reroute the at least one disrupted communication service to the at least one operational front-haul communication link based on the unused bandwidth capacity of the at least one operational front-haul communication link and the at least one determined bandwidth capacity requirement of the at least one disrupted communication service, wherein each of the plurality of remote WDSs comprises:

a plurality of remote units; and a central unit configured to:

distribute a plurality of downlink signals to the plurality of remote units, respectively; and receive a plurality of uplink signals from the plurality of remote units, respectively, and wherein:

the central unit comprises a central unit electrical-to-optical (E/O) converter configured to convert the plurality of downlink signals into a plurality of optical downlink signals;

the plurality of remote units comprises a plurality or remote unit optical-to-electrical (O/E) converters configured to convert the plurality of optical downlink signals into the plurality of downlink signals;

the plurality of remote units comprises a plurality of remote unit E/O converters configured to convert the plurality of uplink signals into a plurality of optical uplink signals; and the central unit comprises a central unit O/E converter configured to convert they plurality of optical uplink signals into the plurality of uplink signals.

21. The WDS network of claim 20, wherein the plurality of remote DRUs are daisy-chained by an inter-remote DRU communication link.

22. The WDS network of claim 20, wherein the central DRU is communicatively coupled to one or more signal sources.

23. The WDS network of claim 22, wherein the one or more signal sources comprise digital baseband units (BBUs).

* * * * *